US005571353A

United States Patent [19]
Golovin

[11] Patent Number: 5,571,353
[45] Date of Patent: Nov. 5, 1996

[54] ELECTRODES FOR SOLID RECHARGEABLE BATTERIES

[76] Inventor: Milton N. Golovin, 145 Manton Dr., San Jose, Calif. 95123

[21] Appl. No.: 102,162

[22] Filed: Oct. 29, 1993

[51] Int. Cl.$^6$ .................................. B32B 31/00
[52] U.S. Cl. .................. 156/64; 429/30; 429/213; 429/223
[58] Field of Search .................. 156/64; 204/424, 204/425, 426, 429; 429/30, 162, 213, 223

[56] References Cited

U.S. PATENT DOCUMENTS

| | | | |
|---|---|---|---|
| 4,582,657 | 4/1986 | Shibata et al. | 204/429 X |
| 4,655,901 | 4/1987 | Mase et al. | 204/429 X |
| 4,831,324 | 5/1989 | Asakura et al. | 324/57 R |
| 4,865,932 | 9/1989 | Masuda et al. | 429/194 |
| 5,110,694 | 5/1992 | Nagasubramanian et al. | 429/192 |

OTHER PUBLICATIONS

F. Capuano, et al., "The Lithium Polymer Electrolyte Battery VI. Design and Characterization of Prototypes", *Journal of Power Sources*, Feb. 1992, vol. 37, No. 3, Lausanne, CH, pp. 369–377, p. 369, paragraph 3; figures 3, 9; p. 369, paragraph 3.

G. Pistoia, et al., "Direct Comparison of Cathode Materials of Interest for Secondary High–Rate Lithium Cells", *Electrochimica Acta*, Jan. 1992, vol. 37, No. 1, pp. 63–68, pp. 65, column 1; paragraph 4; figure 2.

L. Li, et al., "Secondary Lithium Cells. II. Characteristics of Lithiated Manganese Oxides Synthesized from LiNO3 and MnO2", *Solid State Ionics*, pp. 241–249, p. 246, column 2; paragraph 2 and p. 248, column 1; paragraph 2; figures 9 and 10.

Electronanalytical Chemistry, edited by Allen J. Bard, vol. 1 (1966), Marcel Dekker, Inc., New York, pp. 140–146.

On the Impedance of Galvanic Cells, J. H. Sluyters et al. 79 (1960) Recueil, p. 1101.

Solid Polymer Electrolytes, Fiona M. Gray, VCH Publishers, Inc. (1991) pp. 220–237.

Bruno Scrosati, British Polymer Journal 20 (1988) pp. 219–226.

B. C. H. Steel et al., Solid State Ionics 9 & 10 (1983) pp. 391–398.

P. G. Bruce et al., Electrochimica Acta vol. 33, No. 11 (1988) pp. 1669–1674.

P. G. Bruce et al., Solid State Ionics, 36 (1989) pp. 171–174.

T. Jacobsen et al., Electrochimica Acta, vol. 30, No. 9 (1985) pp. 1205–1208.

*Primary Examiner*—James Engel
*Assistant Examiner*—Paul M. Rivard
*Attorney, Agent, or Firm*—Robert Krebs

[57] ABSTRACT

Electrode material for solid electrochemical cells is selected on the basis of its electrochemical impedance spectrum.

13 Claims, 3 Drawing Sheets

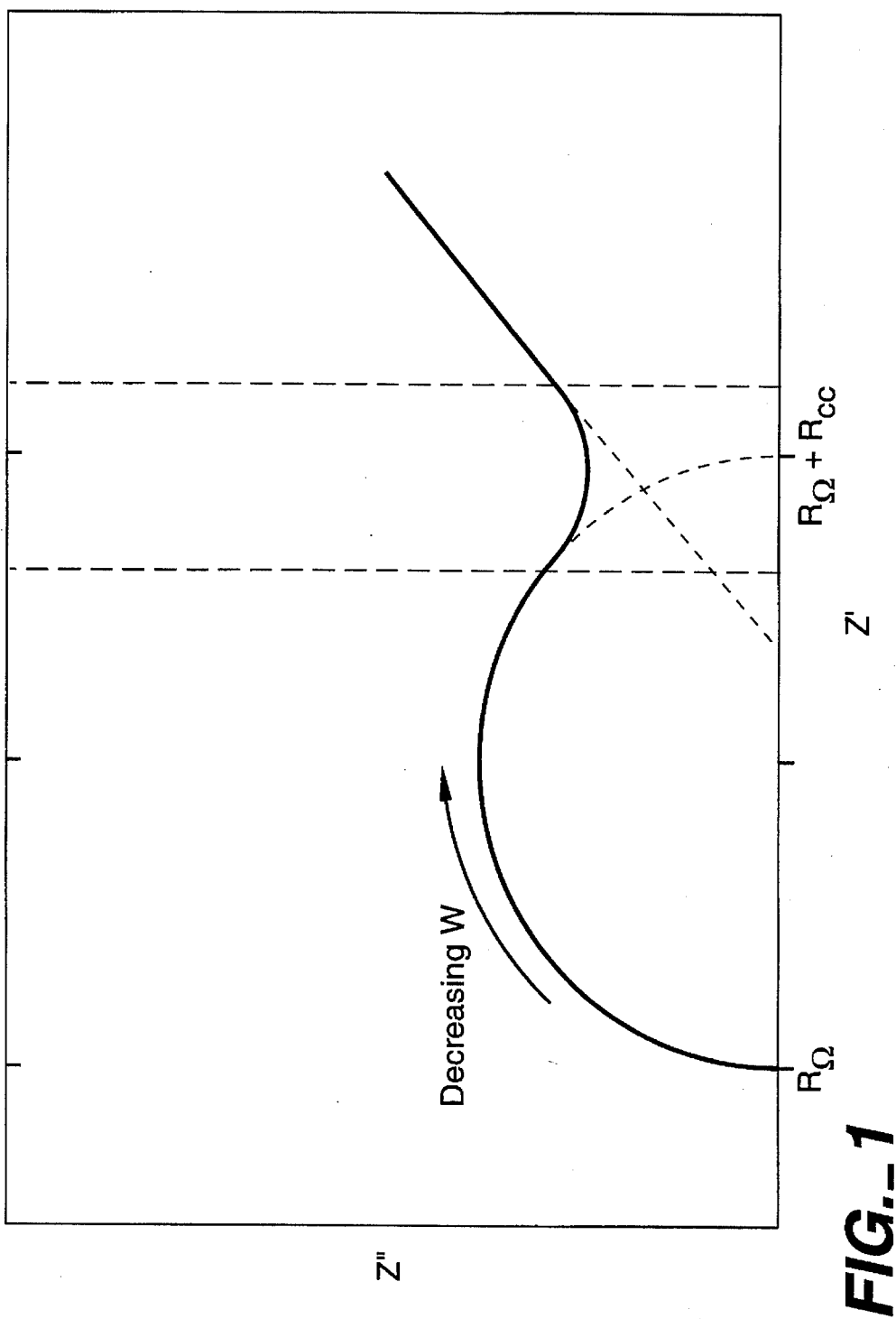
FIG._1

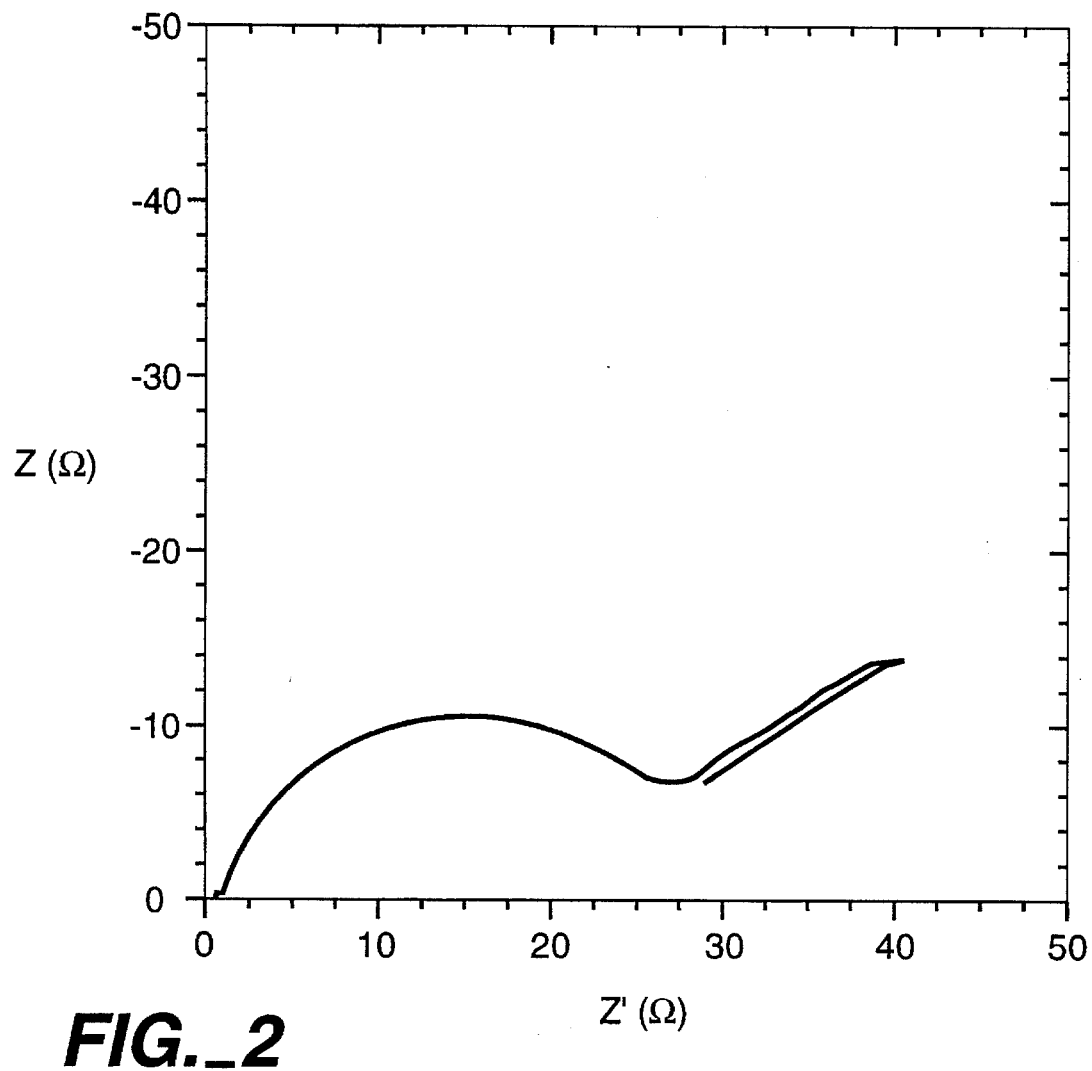
FIG._2

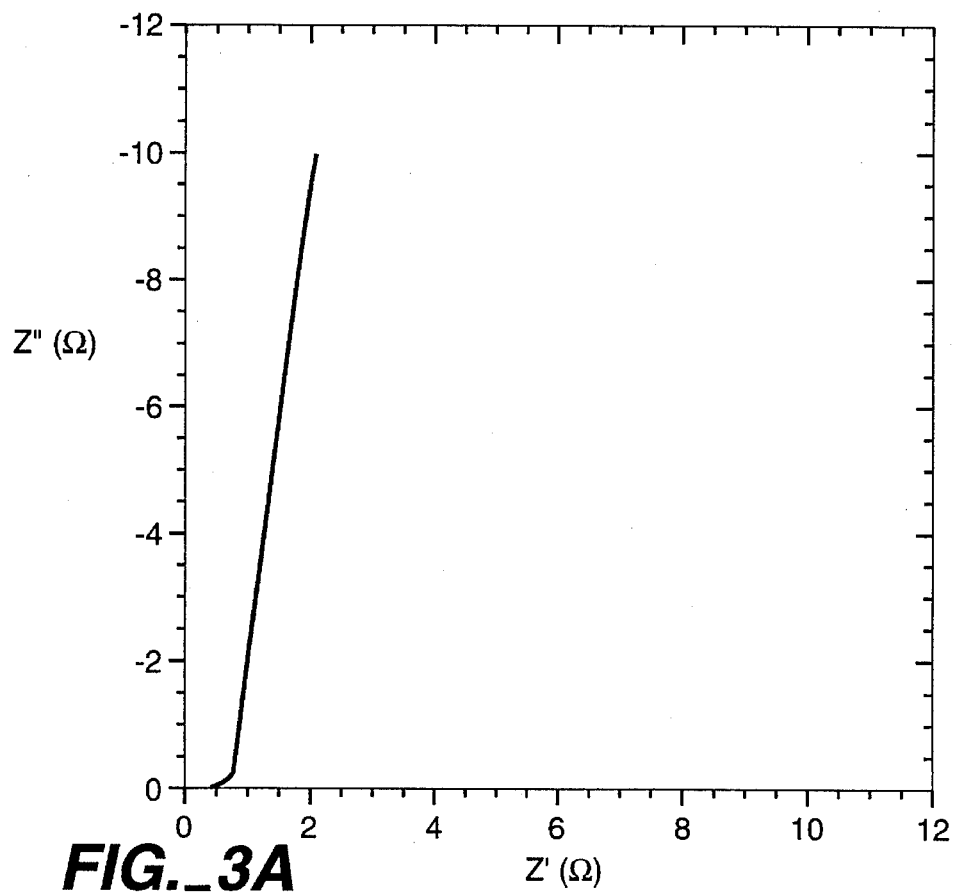
FIG._3A
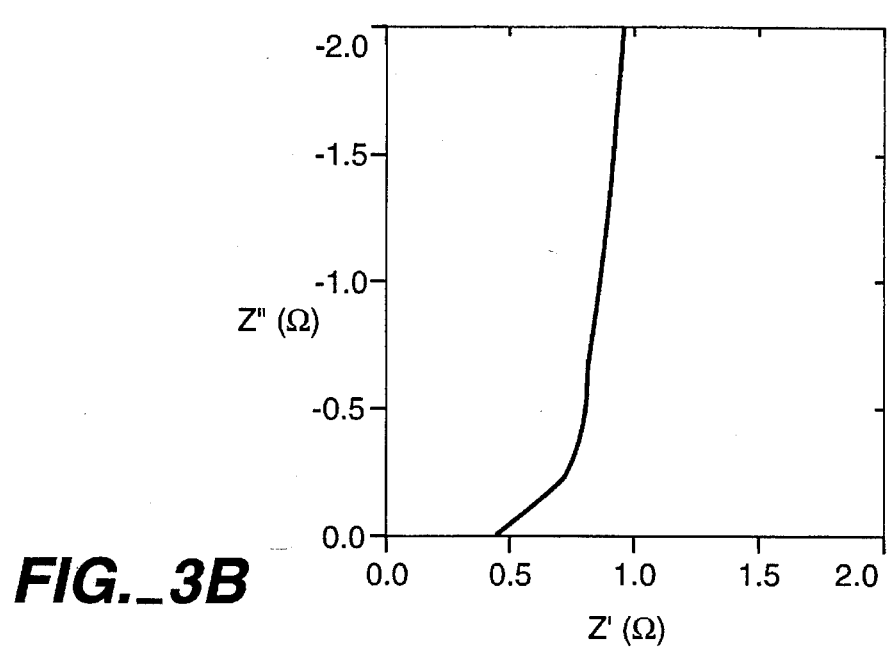
FIG._3B

ELECTRODES FOR SOLID RECHARGEABLE BATTERIES

FIELD OF THE INVENTION

The invention relates to the technology of solid electrochemical cells. More particularly, it relates to the design and manufacture of electrodes for solid electrochemical cells which are long lived and can undergo many discharge-recharge cycles while maintaining satisfactory performance characteristics. More particularly, the invention relates to alkali metal electrochemical cells combining a composite cathode with a compatible anode and a solid electrolyte.

REFERENCES

The following references are cited as superscript numbers at the relevant point of reference in the text.

1. A. J. Bard and L. R. Faulkner, "Electrochemical Methods," John Wiley Sons, New York, 1980, Chapter 9.
2. J. H. Sluyters and J. J. C. Oomen, Recueil Des Travaux Chimiques, Vol. 79, 1960, p. 1101.
3. M. Sluyters-Rehbach and J. H. Sluyters, "Sine Wave Methods in the Study of Electrode Processes", "Electroanalytical Chemistry", Vol. 4, Marcel Dekker, New York, 1970, p. 1.

The references are incorporated herein in their entirety to the same extent and in the same manner as if each individual reference was specifically and individually incorporated by reference in its entirety.

STATE OF THE ART

Electrochemical cells containing an anode, a cathode, and a solid solvent-containing electrolyte are known in the art and are usually referred to as "solid batteries".

The cathode employed in such a cell is typically composed of a compatible cathode material (e.g., insertion compounds) which is any material which functions as a positive electrode in a solid electrochemical cell. Such compatible cathodic materials are well known in the art and include by way of example manganese oxides, molybdenum oxides, oxides of vanadium such as $V_6O_{13}$, $V_2O_5$, $LiV_3O_8$, and the like, sulfides of titanium, molybdenum and niobium, chromium oxide, copper oxide, lithiated cobalt, and nickel oxide. The particular compatible cathode material employed is not critical.

In preparing a cathode, the compatible cathodic material is mixed with an electroconductive material including, by way of example, graphite, particulate carbon such as ground or powdered carbon, powdered nickel, metal particles, conductive polymers (i.e. polymers characterized by a conjugated network of double bonds like polypyrrol and polyacetylene), and the like, with a binder such as poly(tetrafluoroethylene) to form under pressure a cathodic plate.

It has also been recognized that the cathode can be prepared from a cathode paste which comprises from about 35 to about 65 weight percent of a compatible cathodic material; from about 1 to 20 weight percent of an electroconductive material; up to about 20 weight percent of polyethylene oxide having a number average molecular weight of at least 100,000; from about 10 to 50 weight percent of a suitable solvent; and from at least about 5 weight percent to about 30 weight percent of a solid matrix-forming monomer or partial polymer thereof. (All weight percents are based on the total weight of the cathode).

In the production of the paste, the components are typically simultaneously mixed together. Moreover, in such an arrangement, the polyethylene oxide is typically introduced into the other solids in the system, e.g., the compatible cathode material and the electroconductive material.

The cathode paste is spread onto a suitable support such as a current collector and cured by conventional means to provide for a solid, positive, cathodic plate. The cathode (excluding the support) generally has a thickness of about 20 to about 150 microns.

Preferably, in the production of the cathode, the polyethylene oxide is uniformly premixed with substantially all of the liquids, e.g., solvent, prior to introduction of a compatible cathodic material and an electroconductive material. In a preferred embodiment, the polyethylene oxide is mixed with a cathode premix comprising the solvent and an effective amount of solid matrix forming monomer and/or partial polymer thereof. Effective amounts of the compatible cathodic material and electroconductive agent are then mixed, so as to form a cathodic paste. This paste can then be introduced onto a support and cured.

While the construction of a satisfactory solid electrochemical cell is based on the foregoing, as a practical matter, deviations in the mixing of components or in the preparation of components for the composite cathode do occur. Cell performance is dependent on the thorough mixing of metal oxide powders, carbon and the solvent/prepolymer mixture for long cell life and normal charge capacity.

It would be advantageous if cathode materials, and other cell components, could be prescreened for satisfactory operation without construction and testing of large amounts of electrochemical materials, and most advantageously, without field testing.

The accurate analysis of electrochemical cell characteristics is achieved by perturbing the cell with a small sinusoidal perturbation of the steady state cell potential, and observing the way in which the system responds to the perturbation in the steady state. Important advantages of these methods include: 1) the ability to make highly precise measurements, i.e. the response is steady and can be averaged over a long time; and 2) the ability to treat the response in terms of simplified current-potential characteristics. Since the cell is maintained close to its unperturbed state, one often does not require detailed knowledge about the behavior of the i-E response curve over large ranges. This leads to important simplifications in treating the two generic processes of the solid electrochemical cell, namely, chemical kinetics and diffusion.

The typical measurement in this analysis is the electrochemical cell impedance which is measured in a bridge circuit or modern frequency response analyzers. The cell is inserted as the unknown impedance into the impedance bridge, and the bridge is balanced by adjusting R and C in the opposite arm of the bridge.

This operation determines the values of the resistance, R (hereinafter called $R_B$) and the value of the capacitance, C (hereinafter called C) that, in series, behave as the cell does at the applied AC voltage ($E_{ac}$) and frequency ($\omega$). Equivalent circuit theory can interpret the observables $R_B$, $C_B$, $E_{ac}$ and $\omega$ in terms of the chemical kinetics and diffusion phenomena which characterized the cell. Regardless of the theory and the expression of such variables, the present invention is directly related to the observables and the application of this invention only involves obtaining and using these observables.

In particular applications of this invention, the electrochemical cell is replaced by a capacitative laminate of two identical electrodes separated by a solid electrolyte. Since the laminate contains identical electrodes, no cell EMF develops. It is essentially a capacitor. However, the laminate does have impedance, measurable in a bridge circuit as $R_B$ and $C_B$, when $E_{ac}$ is applied at frequency ω.

The analysis of this laminate's impedance is entirely analogous to the analysis of an electrochemical cell's impedance at equilibrium, and the observables can be treated and interpreted in the same manner. The analysis is based on the manner in which the total impedance, i.e. $Z=R_B-j/\omega C_B$ varies with frequency. j is $\sqrt{-1}$. Consequently, Z is a complex number composed of a "real" component, Z', and an "imaginary" component, Z". The fact that Z is a complex number is a way of expressing the fact that the components of Z have a phase relationship. The variation of the real and imaginary components of Z with the frequency, ω, is termed the "electrochemical impedance spectrum", or EIS.

It would be advantageous if the characteristics of a specific electrochemical impedance spectrum could be empirically connected with knowledge of how the cell, having that electrochemical impedance spectrum, will behave in service.

It would be advantageous if cells or laminates could be screened by their EIS to identify those laminates having desirable, electrical characteristics.

SUMMARY OF THE INVENTION

The present invention is based in part on the surprising discovery that electrode material for solid electrochemical cells is selected by obtaining the electrochemical impedance spectrum (EIS) of potential electrode materials and selecting materials having a characteristic spectrum.

In particular, a method of selecting an electrode material for a solid electrochemical cell comprises the steps of forming laminates of two layers of potential electrode materials separated by solid electrolyte, obtaining the electrochemical impedance spectrum of said laminates, and rejecting potential electrode material if the EIS of its laminate contains a substantial semicircular portion (see FIG. 1).

In a particular embodiment of this invention, the capacitative laminates of potential electrode materials are made by laminating a thin layer of solid electrolyte between two layers of electrode material. The EIS of the laminates is taken, and those laminates having $R_{ct}$ greater than about 240 ohm cm$^2$ are rejected. In general, the rejected materials are not suitable for use in secondary electrochemical cells, i.e., cells which require several charge/discharge cycles in normal use.

The measurement of EIS in typically made on a capacitative laminate of about 24 cm$^2$ area, wherein each electrode layer is approximately 80 microns in thickness and the solid electrolyte layer is approximately 50 microns in thickness. Laminates of larger or smaller area may be used as convenient.

In a preferred embodiment, if the value of $R_{ct}$ is greater than about 120 ohm cm$^2$, more preferably greater *than about 48 ohm cm$^2$, and most preferably greater than about 10 ohm cm$^2$, the potential electrode material is rejected.

The method is particularly useful in the selection of cathode materials. Typically, such cathode materials are composites of metal oxides, carbon particles, and a solvent/polymer mix or premix. Such cathodes are referred to as intercalation or insertion cathodes.

In other aspects, the present invention is a composite cathode whose laminate possesses the characteristic electrochemical impedance spectrum heretofore described and the invention also is an electrochemical cell comprising such a composite cathode, as well as a battery comprising a number of such cells.

In particular, the invention includes electrodes whose capacitative laminates with solid electrolytes have an EIS with $R_{ct}$ less than or equal to about 240 ohm cm$^2$, preferably less than 120 ohm cm$^2$, more preferably less than 48 ohm cm$^2$, more preferably less than 24 ohm cm$^2$, even more preferably less than 12 ohm cm$^2$ and most preferably less than about 10 ohm cm$^2$.

Particular electrodes, which find use with solid electrolytes, and have such characteristic EIS, include alkali metal composite electrodes, particularly lithium intercalation cathodes. An example of such cathodes is one containing particulate carbon, particularly one containing an intercalation compound, for example, a vanadium oxide.

BRIEF DESCRIPTION OF THE DRAWINGS

FIG. 1 illustrates a generic EIS.

FIG. 2 illustrates the EIS of a capacitative laminate of potential composite cathode material which should be rejected.

FIG. 3 illustrates the EIS of a capacitative laminate the composite cathode material of which is satisfactory for fabrication into a solid secondary electrochemical cell.

DETAILED DESCRIPTION OF THE PREFERRED EMBODIMENTS

In applying this invention to real electrochemical cells and materials from which electrochemical cells are made, one may express analogies between the electrochemical cell and networks of resistors and capacitors (equivalent circuits) which behave like the electrochemical cell[1]. Regardless of the expression of the invention in terms of equivalent circuit theory, the invention is directly connected to real observable results, and all the parameters in which the invention is expressed are directly connected to reproducible observables.

Before continuing, we will describe the prototypical experiment from which the real observable results expressing the invention are obtained. The cell or laminate is inserted as the unknown impedance into an impedance bridge. The bridge is balanced by adjusting the resistance, R and capacitance, C in the opposite arm of the bridge. This operation determines the value of $R_B$ and $C_B$. Performed manually, the total impedance measurement, $Z=R_B-j/\omega C_B$, would have to be repeated at each frequency, ω. Modern instrumentation performs the impedance measurements in a rapid sweep through appropriate frequencies, and plots the output which is the measured impedance as shown in the Figures. Examples of such instrumentation are the Schlumberger Models SI 1255 and SI 1286, "Electrochemical Impedance Analysis Instrumentation", manufactured and sold by Schlumberger Technologies—Instruments Division, San Jose, Calif.

Before proceeding further with a detailed discussion of this invention, the following terms will first be defined.

Definitions

The term "electrochemical cell" refers to a voltage-producing system containing an anode, a cathode and a solid ion-conducting electrolyte interposed therebetween.

The term "capacitative laminate" refers to two identical electrodes with a layer of solid electrolyte interposed therebetween.

The term "anode" refers to the electrode at which oxidation occurs during the discharge cycle. The anode is typically comprised of a compatible anodic material which is any material which functions as a negative electrode in a solid electrochemical cell. Such compatible anodic materials are well known in the art and include, by way of example, alkali metals such as lithium, alloys, such as alloys of lithium with aluminum, mercury, nickel, zinc, and the like, and intercalation based anodes such as carbon, $WO_3$, and the like.

The term "cathode" refers to the electrode at which reduction occurs during the discharge cycle.

The term "cell impedance", "laminate impedance", or "Z", refers to the total impedance of the cell, $Z=R_B-j/\omega C_B$.

The term "electrochemical impedance spectrum", EIS, refers to a plot of Z' versus Z" at various values of $\omega$. An example of the typical or generic form of the EIS is illustrated in FIG. 1.

The term "$R_\Omega$", shown in FIG. 1, is the intercept of the high frequency impedance spectrum on the real axis (Z'). In terms of the equivalent circuit, $R_\Omega$ is the resistance of the electrolyte and all contact resistances.

In terms of the equivalent circuit[1,2], $R_{ct}$ is called the "charge transfer resistance". $R_{ct}$ is observed and measured as the diameter of the semicircular portion of the laminate's, or cell's, EIS. If, as in FIG. 1, the semicircle is not fully formed, $R_{ct}$ is estimated by extrapolation of the semicircle to the real axis. This is shown in FIG. 1 as a dashed line.

As is evident from FIG. 1, at high frequency, the relationship between Z' and Z" is a circular plot centered at $Z'=R_\Omega+R_{ct}/2$, following the equation;

$$(Z'-R_\Omega-R_{ct}/2)^2+(Z'')^2=(R_{ct}/2)^2.$$

At low frequency, the relationship between Z' and Z" is: $Z''=Z'-R_\Omega-R_{ct}+2\sigma_2 C_d$. Thus the plot of Z" versus Z' is linear at low frequency, with unit slope, as shown in FIG. 1 (The term $2\sigma^2 C_d$ is also characteristic of the cell, see Reference 1.)

In general, the plot of impedance in the complex plane combines the features of the two limiting cases, high frequency and low frequency, in a transition zone as shown in FIG. 1 between the dotted vertical lines. However, for a given electrochemical system, the high frequency region of the EIS may not be so well defined as in FIG. 1. As hereinafter explained, the present invention is not limited to EIS having the generic shape shown in FIG. 1.

While the invention is described in terms of the parameters of the electrochemical impedance spectrum (EIS) of the cell or laminate, and those parameters may or may not be related to concepts found in the equivalent circuit theory of the cell or laminate, it remains true that the EIS of a cell or laminate is an observable available to any skilled worker. Consequently, the parameters, $R_\Omega$ and $R_{ct}$ are typically identifiable and measurable in the EIS of the cell or laminate. On those occasions when the EIS departs from the generic form shown in FIG. 1, sufficient features of the EIS are available and identifiable with the generic form to apply the teachings of this invention to the cell or laminate.

For example, if the charge transfer resistance, $R_{ct}$, were to tend towards 0, the circular portion of the generic EIS spectrum would collapse towards 0 radius and the low frequency linear relationship of Z" with Z' would dominate the EIS[1,2].

In theory, the tendency of $R_{ct}$ to be small is sometimes associated with rapid electrochemical redox reactions at the electrodes, for example, without interference from side reactions.

Whatever the theoretical explanation may or may not entail, the surprising discovery of this invention is that EIS identifies those materials, particularly those composite cathode materials, which are most suitable for the construction of solid electrochemical cells.

In particular, those materials most suitable for use in solid electrochemical cells are those having a small, preferably barely perceptible, semicircular portion in the EIS of their capacitative laminates. The capacitative laminate of a potential electrode material consists of two layers of electrode with a solid electrolyte layer therebetween. Measurements are normally performed using the aforementioned Schlumberger instrumentation on laminate samples of about 24 cm$^2$ area. Preferred layer thicknesses of the electrode layer are about 20–160 microns, and the preferred electrolyte layer thickness is about 20–100 microns, for purposes of EIS measurement.

As is evident from FIG. 1, $R_{ct}$ is the diameter of the aforementioned semicircular portion of the EIS. If $R_{ct}$ is less than 240 ohm cm$^2$, preferably less than 120 ohm cm$^2$, more preferably less than 48 ohm cm$^2$, and most preferably less than 10 ohm cm$^2$, the semicircular portion of the EIS takes on the insignificant character which signals a satisfactory electrode material. Conversely, when $R_{ct}$ is greater than these values the EIS contains a significant semicircular portion to one degree or another.

FIG. 2 illustrates the EIS of a capacitative laminate, as heretofore described, whose electrode material should be rejected because the prominent semicircular region in the EIS correlates with poor cycling performance in an electrochemical cell. The electrode of FIG. 2 is a composite cathode which may be manufactured as hereinafter described, it has a laminate $R_{ct}$ of approximately 30 ohms (720 ohm cm$^2$), which far exceeds the satisfactory limit.

FIG. 3 illustrates the EIS of a capacitative laminate, as heretofore described, whose electrode material is quite acceptable, because of the insignificant semicircular region in EIS correlates with good cycling performance in an electrochemical cell. The inset in FIG. 3 is an expansion of the high frequency end of the EIS of the laminate. A trivial, if any, semicircular region can be discerned in the inset. The value of $R_{ct}$ is estimated as less than 0.1 ohm (2.4 ohm cm$^2$). FIG. 3 displays the expected region of unit slope at 0.5–0.7 ohm (12–16.8 ohm cm$^2$), and a steeply rising portion of the EIS is also evident in FIG. 3 beyond 0.7 ohm (16.8 ohm cm$^2$. The steeply rising portion of the EIS represents the total geometric capacitance of the laminate. It is another characteristic of capacitative laminates composed of electrodes which are satisfactory for electrochemical cells.

The cathode materials of FIGS. 2 and 3 may be fabricated as hereinafter described. The cathode material of FIG. 2 is believed to contain some carbon particles which are too finely ground, and this factor alone can give rise to an unsatisfactory cathode material, detectable by the EIS.

Methodology

A solid electrochemical capacitative laminate is prepared by first preparing a cathodic paste which is spread onto a current collector and is then cured to provide for the cathode. An electrolyte solution is then placed onto the cathode surface and is cured to provide for the solid electrolyte composition. The laminate as described above is next cut to size and two pieces are laminated together to provide a capacitative cell. The specifics of this construction are as follows:

A. The Current Collector

The current collector employed is a sheet of aluminum foil having a layer of adhesion promoter attached to the surface of the foil which will contact the cathode so as to form a composite having a sheet of aluminum foil, a cathode and a layer of adhesion promoter interposed therebetween.

Specifically, the adhesion promoter layer is prepared as a dispersed colloidal solution in one of two methods. The first preparation of this colloidal solution for this example is as follows:

- 84.4 weight percent of carbon powder (Shawinigan Black™—available from Chevron Chemical Company, San Ramon, Calf.)
- 337.6 weight percent of a 25 weight percent solution of polyacrylic acid (a reported average molecular weight of about 90,000, commercially available from Aldrich Chemical Company—contains about 84.4 grams polyacrylic acid and 253.2 grams water)
- 578.0 weight percent of isopropanol The carbon powder and isopropanol are combined with mixing in a conventional high shear colloid mill mixer (Ebenbach-type colloid mill) until the carbon is uniformly dispersed and the carbon particle size is smaller than 10 microns. At this point, the 25 weight percent solution of polyacrylic acid is added to the suspension and mixed for approximately 15 minutes. The resulting mixture is pumped to the coating head and roll coated with a Meyer rod onto a sheet of aluminum foil (about 9 inches wide and about 0.0005 inches thick). After application, the solution/foil are contacted with a Mylar wipe (about 0.002 inches thick by about 2 inches and by about 9 inches wide—the entire width of aluminum foil). The wipe is flexibly engaged with the foil (i.e., the wipe merely contacted the foil) to redistribute the solution so as to provide for a substantially uniform coating. Evaporation of the solvents (i.e., water and isopropanol) via a conventional gas-fired oven provides for an electrically-conducting adhesion-promoter layer of about 6 microns in thickness or about $3 \times 10^{-4}$ grams per cm$^2$. The aluminum foil is then cut to about 8 inches wide by removing approximately ½ inch from either side by the use of a conventional slitter so as to remove any uneven edges.

In order to further remove the protic solvent from this layer, the foil is redried. In particular, the foil is wound up and a copper support placed through the roll's cavity. The roll is then hung overnight from the support in a vacuum oven maintained at about 130° C. Afterwards, the roll is removed. In order to avoid absorption of moisture from the atmosphere, the roll is preferably stored into a desiccator or other similar anhydrous environment to minimize atmospheric moisture content until the cathode paste is ready for application onto this roll.

The second preparation of this colloidal solution comprises mixing 25 lbs of carbon powder (Shawinigan Black™—available from Chevron Chemical Company, San Ramon, Calf.) with 100 lbs of a 25 weight percent solution of polyacrylic acid (average molecular weight of about 240,000, commercially available from BF Goodrich, Cleveland, Ohio, as Good-Rite K702—contains about 25 lbs polyacrylic acid and 75 lbs water) and with 18.5 lbs of isopropanol. Stirring is done in a 30 gallon polyethylene drum with a gear-motor mixer (e.g., Lightin Labmaster Mixer, model XJ-43, available from Cole-Parmer Instruments Co., Niles, Ill.) at 720 rpm with two 5 inch diameter A310-type propellers mounted on a single shaft. This wets down the carbon and eliminates any further dust problem. The resulting weight of the mixture is 143.5 lbs and contains some "lumps".

The mixture is then further mixed with an ink mill which consists of three steel rollers almost in contact with each other, turning at 275, 300, and 325 rpms respectively. This high shear operation allows particles that are sufficiently small to pass directly through the rollers. Those that do not pass through the rollers continue to mix in the ink mill until they are small enough to pass through these rollers. When the mixing is complete, the carbon powder is completely dispersed. A Hegman fineness of grind gauge (available from Paul N. Gardner Co., Pompano Beach, Fla.) indicates that the particles are 4–6 μm with the occasional 12.5 μm particles. The mixture can be stored for well over 1 month without the carbon settling out or reagglomerating.

When this composition is to be used to coat the current collector, an additional 55.5 lbs of isopropanol is mixed into the composition working with 5 gallon batches in a plastic pail using an air powered shaft mixer (Dayton model 42231 available from Granger Supply Co., San Jose, Calf.) with a 4 inch diameter Jiffy-Mixer brand impeller (such as an impeller available as Catalog No. G-04541-20 from Cole Parmer Instrument Co., Niles, Ill.) Then, it is gear pumped through a 25 μm cloth filter (e.g., So-Clean Filter Systems, American Felt and Filter Company, Newburgh, N.Y.) and Meyer-rod coated as described above.

B. The Cathode

The cathode is prepared from a cathodic paste which, in turn, is prepared from a cathode powder as follows:

i. Cathode Powder

The cathode powder is prepared by combining 90.44 weight percent $V^6O^{13}$ [prepared by heating ammonium metavanadate ($NH_4^+VO_3^-$) at 450° C. for 16 hours under $N_2$ flow] and 9.56 weight percent of carbon (from Chevron Chemical Company, San Ramon, Calf. under the tradename of Shawinigan Black™). About 100 grams of the resulting mixture is placed into a grinding machine (Attritor Model S-1 purchased from Union Process, Akron, Ohio) and ground for 30 minutes. Afterwards, the resulting mixture is dried at about 260° C. for 21 hours.

ii. Cathode Paste

A cathode paste is prepared by combining sufficient cathode powder to provide for a final product having 45 weight percent $V_6O_{13}$.

Specifically, 171.6 grams of a 4:1 weight ratio of propylene carbonate:triglyme is combined with 42.9 grams of polyethylene glycol diacrylate (molecular weight about 400 available as SR-344 from Sartomer Company, Inc., Exton, Pa.), and about 7.6 grams of ethoxylated trimethylolpropane triacylate (TMPEOTA) (molecular weight about 450 available as SR-454 from Sartomer Company, Inc., Exton, Pa.) in a double planetary mixer (Ross #2 mixer available from Charles Ross & Sons, Company, Hauppag, N.Y.).

A propeller mixture is inserted into the double planetary mixer and the resulting mixture is stirred at a 150 rpms until homogeneous. The resulting solution is then passed through sodiated 4A molecular sieves. The solution is then returned to double planetary mixer equipped with the propeller mixer and about 5 grams of polyethylene oxide (number average molecular weight about 600,000 available as Polyox WSR-205 from Union Carbide Chemicals and Plastics, Danbury, Conn.) is added to the solution vortex produced by the propeller by a mini-sieve such as a 25 mesh mini-sieve commercially available as Order No. 57333-965 from VWR Scientific, San Francisco, Calf.

The solution is then heated while stirring until the temperature of the solution reaches 65° C. At this point, stirring is continued until the solution is completely clear. The propeller blade is removed and the cathode powder prepared as above is then is added as well as an additional 28.71 grams of unground carbon (from Chevron Chemical Company, San Ramon, Calif. under the tradename of Shawinigan Black™). The resulting mixture is mixed at a rate of 7.5 cycles per second for 30 minutes in the double planetary mixer. During this mixing the temperature is slowly increased to a maximum of 73° C. At this point, the mixing is reduced to 1 cycle per second the mixture slowly cooled to 40° C. to 48° C. (e.g. about 45° C.). The resulting cathode paste is maintained at this temperature until just prior to application onto the current collector.

The resulting cathode paste has the following approximate weight percent of components:

| | |
|---|---|
| $V_6O_{13}$ | 45 weight percent |
| Carbon | 10 weight percent |
| 4:1 propylene carbonate/triglyme | 34 weight percent |
| polyethylene oxide | 1 weight percent |
| polyethylene glycol diacrylate | 8.5 weight percent |
| ethoxylated trimethylolpropane triacrylate | 1.5 weight percent |

In an alternative embodiment, the requisite amounts of all of the solid components are added to directly to combined liquid components. In this regard, mixing speeds can be adjusted to account for the amount of the material mixed and size of vessel used to prepare the cathode paste. Such adjustments are well known to the skilled artisan.

In order to enhance the coatability of the cathode paste onto the current collector, it may be desirable to heat the paste to a temperature of from about 60° C. to about 130° C. and more preferably, from about 80° C. to about 90° C. and for a period of time of from about 0.1 to about 2 hours, more preferably, from about 0.1 to 1 hour and even more preferably from about 0.2 to 1 hour. A particularly preferred combination is to heat the paste at from about 80° C. to about 90° C. for about 0.33 to about 0.5 hours.

During this heating step, there is no need to stir or mix the paste although such stirring or mixing may be conducted during this step. However, the only requirement is that the composition be heated during this period. In this regard, the composition to be heated has a volume to surface area ratio such that the entire mass is heated during the heating step.

A further description of this heating step is set forth in U.S. patent application Ser. No. 07/968,203 filed Oct. 29, 1992 as Attorney Docket No. 1116 and entitled "METHODS FOR ENHANCING THE COATABILITY OF $CAR_B$ ON PASTES TO SUBSTRATES", which application is incorporated herein by reference in its entirety.

The so-prepared cathode paste is then placed onto the adhesion layer of the current collector described above by extrusion at a temperature of from about 45° C. to about 48° C. A Mylar cover sheet is then placed over the paste and the paste is spread to thickness of about 80 microns (μm) with a conventional plate and roller system and is cured by continuously passing the sheet through an electron beam apparatus (Electro-curtain, Energy Science Inc., Woburn, Mass.) at a voltage of about 175 kV and a current of about 1.0 Ma and at a rate of about 1 cm/sec. After curing, the Mylar sheet is removed to provide for a solid cathode laminated to the aluminum current collector described above.

C. Electrolyte 56.51 grams of propylene carbonate, 14.13 grams of triglyme, and 17.56 grams of urethane acrylate (Photomer 6140, available from Henkel Corp., Coating and Chemical Division, Ambler, Pa.) are combined at room temperature until homogeneous. The resulting solution is passed through a column of 4A sodiated molecular sieves to remove water and then mixed at room temperature until homogeneous.

At this point, 2.57 grams of polyethylene oxide film forming agent having a number average molecular weight of about 600,000 (available as Polyox WSR-205 from Union Carbide Chemicals and Plastics, Danbury, Conn.) is added to the solution and then dispersed while stirring with a magnetic stirrer over a period of about 120 minutes. After dispersion, the solution is heated to between 60° C. and 65° C. with stirring until the film forming agent dissolved. The solution is cooled to a temperature of between 45° C. and 48° C., a thermocouple is placed at the edge of the vortex created by the magnetic stirrer to monitor solution temperature, and then 9.24 grams of $LiPF_6$ is added to the solution over a 120 minute period while thoroughly mixing to ensure a substantially uniform temperature profile throughout the solution. Cooling is applied as necessary to maintain the temperature of the solution between 45° C. and 48° C.

In one embodiment, the polyethylene oxide film forming agent is added to the solution via a mini-sieve such as a 25 mesh mini-sieve commercially available as Order No. 57333-965 from VWR Scientific, San Francisco, Calif.

The resulting solution contains the following:

| Component | Amount | Weight Percent[a] |
|---|---|---|
| Propylene Carbonate | 56.51 g | 56.51 |
| Triglyme | 14.13 g | 14.13 |
| Urethane Acrylate | 17.56 g | 17.56 |
| $LiPF_6$ | 9.24 g | 9.24 |
| PEO Film Forming Agent | 2.57 g | 2.57 |
| Total | 100 g | 100 |

[a]weight percent based on the total weight of the electrolyte solution (100 g)

This solution is then degassed to provide for an electrolyte solution wherein little, if any, of the $LiPF_6$ salt decomposes.

Optionally, solutions produced as above and which contains the prepolymer, the polyalkylene oxide film forming agent, the electrolyte solvent and the $LiPF_6$ salt are filtered to remove any solid particles or gels remaining in the solution. One suitable filter device is a sintered stainless steel screen having a pore size between 1 and 50 μm at 100% efficiency.

Alternatively, the electrolyte solution can be prepared in the following manner. Specifically, in this example, the mixing procedure is conducted using the following weight percent of components:

| | |
|---|---|
| Propylene Carbonate | 52.472 weight percent |
| Triglyme | 13.099 weight percent |
| Urethane Acrylate[b] | 20.379 weight percent |
| $LiPF_6$ | 10.720 weight percent |
| PEO Film Forming Agent[c] | 3.340 weight percent |

[b](Photomer 6140, available from Henkel Corp., Coating and Chemical Division, Ambler, PA)
[c]polyethylene oxide film forming agent having a number average molecular weight of about 600,000 (available as Polyox WSR-205 from Union Carbide Chemicals and Plastics, Danbury, CT)

The mixing procedure employs the following steps:

1. Check the moisture level of the urethane acrylate. If the moisture level is less than 100 ppm water, proceed to step 2. If not, then first dissolve the urethane acrylate at room temperature, <30° C., in the propylene carbonate and triglyme and dry the solution over sodiated 4A molecular sieves (Grade 514, 8–12 Mesh from Schoofs Inc., Moraga, Calif.) and then proceed to step 4.

2. Dry the propylene carbonate and triglyme over sodiated 4A molecular sieves (Grade 514, 8–12 Mesh from Schoofs Inc., Moraga, Calf.).

3. At room temperature, <30° C., add the urethane acrylate to the solvent prepared in step 2. Stir at 300 rpm until the resin is completely dissolved. The solution should be clear and colorless.

4. Dry and then sift the polyethylene oxide film forming agent through a 25 mesh mini-sieve commercially available as Order No. 57333-965 from VWR Scientific, San Francisco, Calf. While stirring at 300 rpm, add the dried and pre-sifted polyethylene oxide film forming agent slowing to the solution. The polyethylene oxide film forming agent should be sifted into the center of the vortex formed by the stirring means over a 30 minute period. Addition of the polyethylene oxide film forming agent should be dispersive and, during addition, the temperature should be maintained at room temperature (<30° C.).

5. After final addition of the polyethylene oxide film forming agent, stir an additional 30 minutes to ensure that the film forming agent is substantially dispersed.

6. Heat the mixture to 68° C. to 75° C. and stir until the film forming agent has melted and the solution has become transparent to light yellow in color. Optionally, in this step, the mixture is heated to 65° C. to 68° C.

7. Cool the solution produced in step 6 and when the temperature of the solution reaches 40° C., add the $LiPF_6$ salt very slowly making sure that the maximum temperature does not exceed 55° C.

8. After the final addition of the $LiPF_6$ salt, stir for an additional 30 minutes, degas, and let sit overnight and cool.

9. Filter the solution through a sintered stainless steel screen having a pore size between 1 and 50 µm at 100% efficiency.

At all times, the temperature of the solution should be monitored with a thermocouple which should be placed in the vortex formed by the mixer.

Afterwards, the electrolyte mixture is then coated by a conventional knife blade to a thickness of about 50 µm onto the surface of the cathode sheet prepared as above (on the side opposite that of the current collector) but without the Mylar covering. The electrolyte is then cured by continuously passing the sheet through an electron beam apparatus (Electrocurtain, Energy Science Inc., Woburn, Mass.) at a voltage of about 175 kV and a current of about 1.0 mA and at a conveyor speed setting of 50 which provides for a conveyor speed of about 1 cm/sec. After curing, a composite is recovered which contained a solid electrolyte laminated to a solid cathode.

D. Capacitative Laminate

To complete the capacitative laminate for EIS measurement, a second solid electrolyte cathode sheet laminated to an aluminum current collector, as described above, is laminated to the aforementioned solid electrolyte-solid cathode laminate so that both solid cathodes are in electrochemical contact with the solid electrolyte.

What is claimed is:

1. A method of selecting an electrode material for a solid electrochemical cell comprises the steps of forming a capacitative laminate of a potential electrode material and an electrolyte, obtaining the electrochemical impedance spectrum of said laminate, and rejecting said potential electrode material if said spectrum contains a substantial semicircular portion wherein the capacitative laminate comprises two identical electrodes having said electrolyte interposed therein between.

2. A method of selecting an electrode material for a solid electrochemical cell comprises the steps of forming a capacitative laminate of two layers of potential electrode material with a solid electrolyte layer therebetween, obtaining the electrochemical impedance spectrum of said laminate, and rejecting said potential electrode material if $P_{ct}$ is greater than about 240 ohm cm$^2$ wherein the capacitative laminate comprises two identical electrodes having said electrolyte interposed therein between.

3. A method according to claim 2 wherein said solid electrolyte layer is approximately 20–100 microns in thickness, and said electrode layer is approximately 20–160 microns in thickness.

4. A method according to claim 1 wherein said electrode is a cathode.

5. A method according to claim 1 wherein said solid electrochemical cell is based on the electrochemical reaction $A^+ + e = A°$, where A is an alkali metal.

6. A method according to claim 4 wherein said cathode is an intercalation cathode.

7. A method according to claim 5 wherein A is lithium.

8. A method according to claim 2 wherein $R_{ct}$ is greater than about 120 ohm cm$^2$.

9. A method according to claim 2 wherein $R_{ct}$ is greater than about 48 ohm cm$^2$.

10. A method according to claim 6 wherein said intercalation cathode comprises $V_6O_{13}$.

11. A method according to claim 6 wherein said intercalation cathode comprises a material selected from the group consisting of manganese oxides, molybdenum oxides, oxides of vanadium, sulfides of titanium and niobium, chromium oxide, copper oxide, lithiated cobalt, nickel oxide, carbon, and mixtures thereof.

12. A method according to claim 2 wherein $R_{ct}$ is greater than about 24 ohm cm$^2$.

13. A method according to claim 2 wherein $R_{ct}$ is greater than about 10 ohm cm$^2$.

* * * * *